Patented Aug. 30, 1932

1,875,294

UNITED STATES PATENT OFFICE

CHARLES CHOLERTON, OF NORTH BERGEN, NEW JERSEY, ASSIGNOR TO SHELLASTIC, INC., A CORPORATION OF DELAWARE

PRODUCTION OF MOLDED ARTICLES

No Drawing.   Application filed May 8, 1930.  Serial No. 450,879.

Various colloidal materials of a gummy or gelatinous nature (whether from an animal or a vegetable source) form gels with water, but when dry are very brittle. If such materials are relied on as binders for finely divided solids, the resulting mass may have some temporary resiliency before the gummy ingredients fully dry out, but this will soon be lost. Examples of materials of this type are gum arabic, gum tragacanth and glue. These are examples of what may be termed water-soluble colloids, for they readily form colloidal solutions in water. I have discovered that if these water-soluble colloids are heated with non-water soluble thermoplastics of a resinous nature together with a relatively large amount of finely divided solid material and the mass is heated under pressure until a substantial amount of water has been eliminated, the two types of vegetable material appear to combine and apparently form some sort of colloidal solution yielding an elastic mass of great permanency. Examples of non-water soluble thermo-plastics that may be used are pine tar and asphalt. Various other ingredients may likewise be employed, but these are typical, and the pine tar in particular is advantageously used in connection with my invention.

The most useful purpose to which my invention has thus far been applied is in the manufacture of a rubber substitute—that is, a material which in finished form has the appearance of a cured compounded rubber. Apparently the two types of softenable materials have so contributed their divergent qualities to the product that the latter is insoluble in water, shows little or no tendency to soften with heat in moderate ranges and seems to be extraordinary resistant to hardening or depreciation with age. In selecting proportions and materials to be used, their qualities must be considered. Glue increases the tensile strength, but tends, alone, to make the product too hard, whereas, the vegetable gums appears to increase the resiliency. Of the non-water soluble thermoplastics, the vegetable type appears to be the more important, but the asphalt, like the glue, seems to increase the tensile strength. Pine tar pitch alone (or combined with asphalt) gives a product somewhat too hard for ordinary uses, and I find the result is improved if there is included some pine tar oil as a softener. For some purposes, pine tar resin may also be used in the mixture.

As regards the finely divided solid material that is included, I find that a filler excellently adapted to my purpose can be made by heating oyster shells to the point where they partially decompose so that they can readily be ground into a fine powder but short of the calcining temperature. Other types of finely pulverized substances may be used such as the mineral filler or carbon black that are ordinarily employed in rubber compounds or these fillers may be combined. Enough of the dry finely divided filler should be employed so that after the final mixing is complete the mass will have the appearance of a substantially dry powder.

The powder resulting from the mixture of the various ingredients is pressed in a mold under heavy pressure (that is a pressure in the order of 1000 pounds per square inch or higher) and kept substantially above the boiling point of water for several hours, for example, the heat may be from 240 to 260° F., though higher temperatures may be used if desired up to say about 300° F. Even after this continued heating, the molds must be allowed to cool slowly and must not be opened until cool. When this is done, a product is obtained of great resiliency, substantial strength and one which is remarkably permanent against aging. On the other hand, if the molds are opened prematurely, the material swells and loses its shape and strength.

It is my belief that under the conditions stated, the water-soluble colloids are largely dehydrated and form some sort of colloidal solution or amalgamation with the thermoplastic material, and this combination comes to a stable equilibrium during the heating and cooling. It may be that some polymerization may take place, for my experience has shown that the inclusion of some sulphur appears to be helpful. However, this sulphur may simply assist in the colloidal combination referred to.

For the purposes of illustration, I give an example which shows one specific way in which my invention may be carried out. Equal parts of gum arabic, gum tragacanth and glue are softened in water, for example, in the proportion of one pound of each of these ingredients with 16 gallons of water.

Oyster shell material is separately prepared by washing the oyster shells preferably with a small amount of acid which is in turn washed off, and then heating the shells for about five hours to a temperature of 1000° F., preferably in the presence of small amounts of cyanide, such as potassium cyanide, sulphur and litharge. The shells which have thus been heated are ground until the powder will pass through a 30 mesh screen, and any metallic ingredients present may be removed by a magnetic separator. Any other solid ingredients are mixed dry with the shells; for example, I may include with each 100 pounds of shells about 12½ pounds of carbon black, 1½ pounds of sulphur, 10 pounds of zinc oxide and 5 pounds of magnesia. The completeness of the mixing is indicated when the carbon black is so disseminated through the mass that apparently it has coated all of the particles. To 50 pounds of the dry material there is added 12½ quarts of the colloidal solution of the gelatinous ingredients referred to above, together with the thermo-plastic ingredients of a resinous nature. These, for example, may include 25 ounces of mineral rubber, 6 pounds of pine tar oil, 25 ounces pine tar pitch, 12½ ounces of rosin, 12½ ounces of paraffin. Additional quantities of sulphur and litharge may also be included at this time, and if desired a vulcanizing accelerator may be added. After the ingredients are stirred together, they are mixed on a pair of refiner rolls which are set very close together and which have been heated as for example with steam at 80 pounds pressure. The powder is worked on these rolls until it is thoroughly dry, forming a fluffy mass. It is then allowed to cool in layers, with access of air to prevent undue localized heat. If desired, the time of treatment on the refiner rolls may be somewhat shortened and the powder dried in any appropriate form of dryer. In any event, the water is largely eliminated while the non-water soluble thermo-plastics are maintained at a temperature sufficient to melt or substantially soften them.

The powder thus produced is put in a mold and compressed under heavy pressure as for example from 1000 to 6000 pounds per square inch of projected mold area. The mold is then locked shut to maintain the material under compression and heated above the boiling point of water, as for example, at a temperature of 260° F. until the volatile ingredients (including residual water) have largely been driven out of the mass. This may take from 1 to 2 hours. I then permit the molds to cool off until their temperature and the temperature of the molded material is below 212° F. so that a pressure equilibrium will have been reached, and there will no longer be steam pressure within the molded article. The molds are then opened and preferably the products are allowed to cool slowly. Even after cooling, there is some internal adjustment, as the quality of the article improves for a number of days.

The resulting product is elastic like molded compounded rubber and shows extraordinary resistance to any further changes in any way related to aging of elastic substances.

It is to be understood that the foregoing example is given only by way of illustration and is not in any way intended as imposing a limitation as regards exact materials selected or the proportions thereof.

What I claim is:

1. The process of making resilient bodies which comprises softening water-soluble colloidal material comprising a gelatinous substance with water, mixing therewith non-water soluble thermo-plastic material of a pitchy nature and finely divided solid material, compressing the same and heating to drive off volatile ingredients and maintaining the same under pressure until a substantial pressure equilibrium is reached.

2. The process of making resilient bodies which comprises softening water-soluble colloidal material of a gelatinous nature with water, mixing therewith non-water soluble thermo-plastic material of a resinous nature and finely divided solid material, and compressing the mass under heavy pressure, heating it to drive off volatile ingredients and holding the mass under pressure until an equilibrium is established.

3. The process of producing resilient products which comprises the steps of softening with water glue and water-soluble vegetable gums, mixing together finely ground solid material produced by decomposing oyster shells with heat, and non-water soluble resinous material comprising pine tar, and incorporating the aforesaid water softened material therewith, working the mix to produce a substantially dry powder, compressing such powder under heavy pressure, heating the compressed material above 212° F. until the volatile ingredients have largely been driven off and cooling while the material is held under compression until the temperature of the material is below 212° F.

4. The process of making resilient bodies which comprises the steps of mixing together softened thermo-plastic non-water soluble material, finely divided solid material, and a water-soluble colloidal material which has been softened with water, molding the mixture under pressure and heating and cooling while under pressure.

5. In the process of producing resilient products the steps of heating under pressure a mixture comprising a colloidal solution comprising gelatinous ingredients, pine tar pitch and finely divided solid material, maintaining the temperature above 212° F. until the volatile ingredients have largely been eliminated and maintaining the material under compression until a substantial pressure equilibrium has been established.

6. In the process of producing elastic bodies, the steps of thoroughly mixing together non-water soluble resinous material and finely divided solid material and thoroughly incorporating with such mix a colloidal solution of water soluble gelatinous material and eliminating a substantial amount of water therefrom.

7. As a new product, a resilient mass comprising gelatinous material held in colloidal solution in natural resinous material.

8. As a new product, a resilient mass comprising gelatinous material amalgamated with natural resinous material in the presence of finely divided solid material including a powder derived from oyster shells partly decomposed with heat.

CHARLES CHOLERTON.